(12) United States Patent
Bartz et al.

(10) Patent No.: US 6,785,881 B1
(45) Date of Patent: Aug. 31, 2004

(54) DATA DRIVEN METHOD AND SYSTEM FOR MONITORING HARDWARE RESOURCE USAGE FOR PROGRAMMING AN ELECTRONIC DEVICE

(75) Inventors: Manfred Bartz, Snohomish, WA (US); Marat Zhaksilikov, Snohomish, WA (US); Kenneth Y. Ogami, Bothell, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 69 days.

(21) Appl. No.: 09/989,815

(22) Filed: Nov. 19, 2001

(51) Int. Cl.[7] .................................................. G06F 9/45
(52) U.S. Cl. ............................................................ 717/110
(58) Field of Search ............................................ 717/110

(56) References Cited

U.S. PATENT DOCUMENTS

| | | | | |
|---|---|---|---|---|
| 4,937,743 A | * | 6/1990 | Rassman et al. ............... | 705/8 |
| 5,708,798 A | * | 1/1998 | Lynch et al. ................... | 703/1 |
| 6,088,732 A | * | 7/2000 | Smith et al. ................ | 709/229 |
| 6,154,787 A | * | 11/2000 | Urevig et al. .................. | 710/8 |
| 6,219,728 B1 | * | 4/2001 | Yin .............................. | 710/52 |
| 6,249,795 B1 | * | 6/2001 | Douglis ....................... | 715/511 |
| 6,253,282 B1 | * | 6/2001 | Gish ........................... | 711/113 |
| 6,338,080 B1 | * | 1/2002 | Durand et al. .............. | 709/104 |
| 2002/0133593 A1 | * | 9/2002 | Johnson et al. ............. | 709/226 |
| 2002/0178262 A1 | * | 11/2002 | Bonnell et al. ............. | 709/225 |

* cited by examiner

*Primary Examiner*—John Chavis
(74) *Attorney, Agent, or Firm*—Wagner, Murabito & Hao LLP

(57) ABSTRACT

A data driven method and a system for monitoring resource usage for programming a microcontroller. The microcontroller design system includes a configuration and design system with integrated datasheet information and having three independent, but integrated workspaces to provide a programmer an organized way of displaying configuration and design information. The three workspaces include a user module selection workspace, a user module placement workspace and a user module pin out workspace for allowing the programmer to select desired function components for a target microcontroller device. The configuration and design system includes data files that specify hardware resources that are tracked as the designer selects user modules to program the microcontroller. Resource usage values are cumulatively tracked and displayed interactively in a resource manager workspace to enable the designer to keep constant track of the type of resources and the amount of resources used.

37 Claims, 7 Drawing Sheets

DATA DRIVEN METHOD AND SYSTEM FOR MONITORING HARDWARE RESOURCE USAGE FOR PROGRAMMING AN ELECTRONIC DEVICE

CROSS REFERENCE TO RELATED APPLICATION

This application is related to Bartz et al., co-filed U.S. patent application Ser. No.: 09/989,574, entitled "METHOD AND SYSTEM FOR USING A GRAPHICS USER INTERFACE FOR PROGRAMMING AN ELECTRONIC DEVICE." This application is also related to Warren Snyder ("Snyder"), U. S. patent application Ser. No. 10/033,027, entitled "PROGRAMMABLE MICROCONTROLLER ARCHITECTURE," filed Oct. 22, 2001. To the extent not repeated herein, the contents of these patent applications are incorporated herein by reference.

FIELD OF THE INVENTION

The present claimed invention relates generally to an apparatus and method for programming an electronic device. More particularly, the present claimed invention relates to a system and a method of using a graphics applications programming interface in programming the design of a microcontroller.

BACKGROUND ART

Microcontroller devices which utilize nonvolatile memories, such as Electrically Programmable Read Only Memories (EPROMs) are well known in the art. The EPROM or flash memory generally contains the applications software for the microcontroller and must be programmed with data depending upon the particular intended application for the microcontroller. The application software is generally developed using a personal computer. Configuration registers can be programmed from the data loaded into the microcontroller's programmable memory to in turn program hardware resources of the microcontroller.

The data representing this application software, commonly known as a load module, are then transferred to special purpose programming equipment, such as a Data I/O machine. The memory of the microcontroller is then programmed by the special purpose programming equipment usually without employing the processing capabilities of the microcontroller. When such special purpose programming equipment is used, the microcontroller is typically physically placed in the circuit of the programming equipment to accomplish the programming process.

Occasionally, it is necessary to modify the existing contents of the microcontroller's memory, such as during testing, development, or adjustment of the process executed by the microcontroller. To perform this alteration with conventional microcontroller devices, it is usually necessary to remove the microcontroller from the system in which it is installed and place it in the circuit of the programming equipment.

Another technique that is currently used by microcontroller devices can be referred to as automatic self programming (ASP). ASP requires that the microcontroller containing programmable memory be placed in circuit with a source memory containing data that will be transferred to the microcontroller's memory. When appropriate control signals and programming voltages are applied, the microcontroller transfers data from the source memory to its own memory. Clearly, this technique requires the source memory to be preprogrammed by special purpose programming equipment.

Some microcontroller devices include provisions for programming the microcontroller memory while the unit remains installed in the system. These devices manifest a feature commonly known as run time programming. Run time programming schemes generally provide special circuits that allow user application software to modify the memory contents. This modification or programming, is usually done by invoking a particular subroutine during the normal course of software execution. One disadvantage of run time programming is that it usually requires the user to devote a portion of the microcontroller's available memory space to support the programming function. This memory space is generally used for a software subroutine that serves as an interface between the user's application software and the microcontroller's programming mechanism.

A second disadvantage of the run time programming is that they are not well suited to programming a completely new (un-programmed) microcontroller. Since most run time programming mechanisms are dependent on the above mentioned interface subroutine, they must have the interface subroutine installed by means of special purpose programming equipment before it can be used to program any of the remaining user memory space.

In addition to the drawback described above, the user interface portions of many conventional software applications for programming microcontrollers are very difficult to use. Many of the user interface windows used in the software tend to pop-up as the user is attempting to program the microcontroller. Windows in the design software are popped based on a "flat-organized" drop down menu system with little or no cues as to the overall design process. Each window tends to correspond to a discrete function of the microcontroller and many functions may be required to do simple programming tasks. Importantly, the windows give no information as to which ones should be used first and the subsequent order that they should be used in. Also, it was difficult transitioning from one window to another for sharing resources because the programmer could not remember which window contained the source of data required data and which window needed the data. Having many windows open on a computer screen can often confuse the programmer as the programmer is unable to keep track of which window represents which function of the microcontroller.

Another drawback of the conventional microcontroller programming method described above is the inability to track hardware resources, such as memory, power, programmable logic, etc., used as the programmer adds or deletes components to a system that is to be implemented on a target device.

SUMMARY OF INVENTION

Accordingly, to take advantage of applications and the numerous microcontrollers being developed, a microcontroller programming application with extensibility capabilities to allow programmers to dynamically program a microcontroller with datasheets incorporated in the programming software is needed. A need also exists for "out-of-the-box" microcontroller programming system solutions to allow programmers to efficiently organize design components necessary for the complete programming of a microcontroller without unduly tasking the programmer while tracking system resource usage by the target microcontroller. Specially, embodiments of the present invention provide an organized way of displaying configuration and design workspace information in an efficient manner including information regarding hardware resource usage.

Embodiments of the present invention are directed to a system and a method for using a graphical user interface system for programming microcontrollers in a microcontroller design environment. In general, embodiments of the present invention provide a graphics interface based modularized method of programming for designing features of a programmable microcontroller having programmable hardware resources while tracking available hardware resource blocks. In other words, the invention provides the programmer the ability to organize various functional components of the microcontroller with integrated datasheet information readily on the same computer screen by implementing click and drop features of the design software. The present invention also provides the programmer with resource monitoring capabilities for the programmer to perform monitoring of available programmable resources of the target microcontroller.

Embodiments of the invention include a microcontroller programming software application and system that include a configuration and design system that allows the programmer to compartmentalize the design of a microcontroller by modularizing the various components that create the desired functionality of the microcontroller using a graphics user interface. The contents of the configuration and design system are presented to the programmer in the form of sub-workspaces which are displayed on the programmer's computer screen. The programmer is then able to navigate through various selection windows and icons to retrieve information on selected predefined and pre-configured user modules of the desired microcontroller components. The workspaces can be presented according to a predetermined sequence to aid the programmer's development tasks.

Embodiments of the present invention include user modules that contain pre-configured functions or designs of a target microcontroller device and present the available resources in the design datasheets. The information provided by the user module is typically presented in the form of a window with icons of the available resources that may be selected by the programmer. The user modules once selected, placed and programmed work as peripherals of the target microcontroller.

Embodiments of the present invention also include a user module information presenter. The user module information presenter is presented to the programmer as sub-workspaces as of the overall design environment on the programmer's computer screen. The user module information presenter provides detailed schematic information about a component selected by the programmer for incorporation into the microcontroller. The user module information presented allows the programmer to examine the functional details about a selected component before designing the selected component into the microcontroller.

Embodiments of the present invention also include a resource manager display system. The resource display manager system provides real-time histogram view (e.g., a graphical view showing cumulative use of different types of resources) of the resources being used by the programmer to design the desired microcontroller. The resource display manager enables the programmer to only select only enough user modules that the microcontroller provides resources. If the programmer selects a module that requires more resources than is available, the design software of the present invention will not allow such a selection. The resource manager displays hardware resource usage by type and contents occupied/vacant, etc.

Embodiments of the present invention also include a user selection module. The user selection module provides a catalog of selectable user modules that are available for the programmer to select and a schematic display of a selected user module with a corresponding datasheet information. This sub-workspaces allows the designer to select the appropriate user module for a particular function.

Embodiments of the present invention also include a user module data file for providing the programmer a data entry environment to interactively enter desired data information of portions or sub-portions of the functional components of the user modules. The data files can easily be updated by the programmer without having to change the underlying resource manager code to reflect the resource tracking that the programmer desires.

Embodiments of the present invention also include design system blocks that are used by the programmer to place selected user modules to help program the target microcontroller. The design system blocks are analog and digital hardware resource or peripheral blocks of a target microcontroller device that are customized by the placement and configuration of the user modules of the present invention.

Embodiments of the present invention also include a component information database that stores detailed description of the components that form the modularized functional blocks of the user modules.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrates embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments.

On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The invention is directed to a system, an architecture, subsystem and method to program desired functionality into a microcontroller using a graphical user interface with an application program interface based design software with integrated datasheet of components that may be designed into the microcontroller. In accordance with an aspect of the invention, a microcontroller programmer is able to interactively select and incorporate desired electronics components into a target microcontroller from a catalog of available modularized components in a database while monitoring resource use by the selected modules.

Generally, an aspect of the invention encompasses providing a graphics user interface design platform for monitoring resource usage by selected user modules that are selected and programmed by a programmer for a target microcontroller. The invention can be more fully described with reference to FIGS. 1 through 7.

Figure 1:
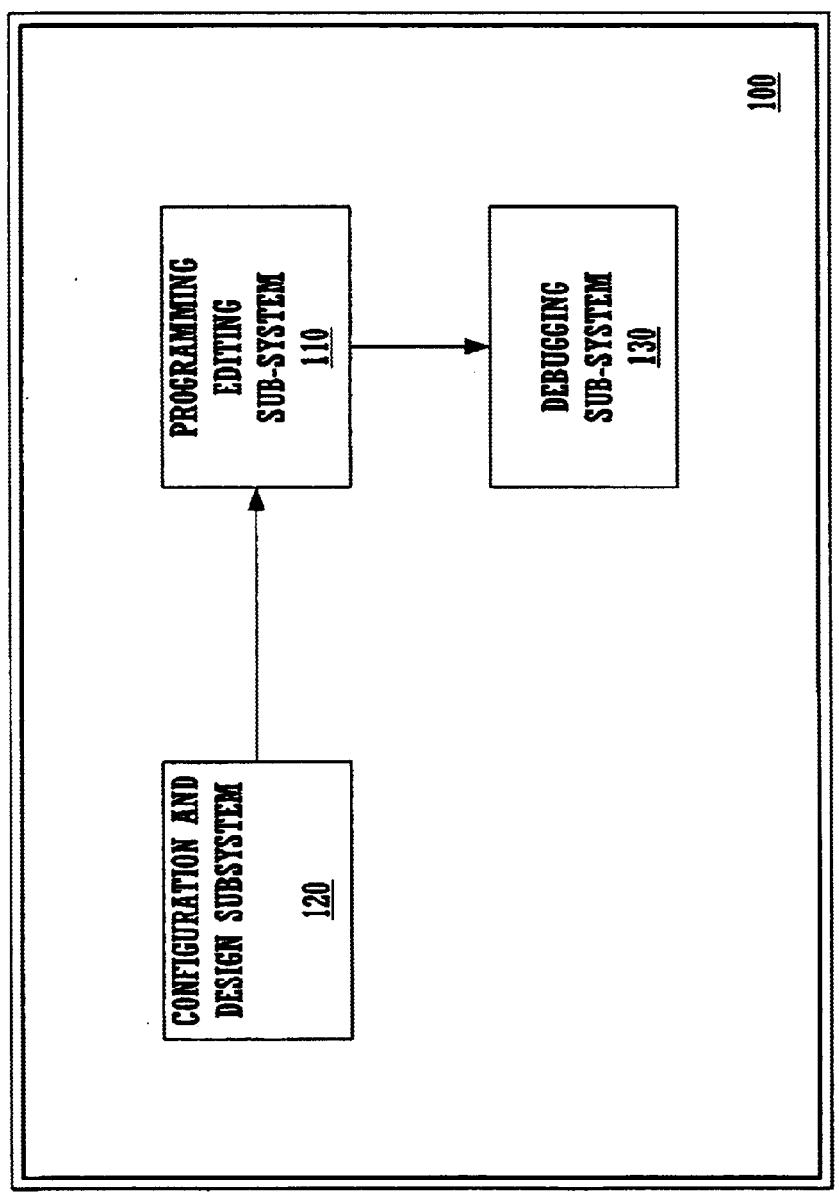
FIG. 1 is a block diagram of the microcontroller design software tool of the present invention.

FIG. 1 is a block diagram illustration of an embodiment of the microcontroller design system 100 (MDS 100) of one embodiment of the present invention. The MDS 100 of the present invention is suitable for programmable electronic devices and is executed as a software program in memory that is stored in a programmer's computer hard drive. The function of MDS 100 is described in the related U.S. Patent Application Ser. No. 10/033,027 entitled "PROGRAMMABLE MICROCONTROLLER ARCHITECTURE," filed on Oct. 22, 2001 by Warren Snyder, assigned to the assignee of the present invention and hereby incorporated herein by reference. As shown in FIG. 1, the MDS 100 comprises a programming editing sub-system 110, a configuration and design sub-system 120 and a debugging sub-system 130.

The configuration and design sub-system 120 provides the programmer with an editing platform for the programmer to select and design-in desired components from a database of available pre-configured user modules for a target microcontroller. The configuration and design sub-system 120 allows the programmer to select applicable user modules, configure and place these modules in the MDS 100 blocks, make interconnections, set pin outs and track resource usage as the target microcontroller device is programmed. In one embodiment of the present invention, the user module database is integrated with datasheet information of each module in the database. This facilitates user module selection.

To program the desired target microcontroller, the programmer begins by defining a configuration method. In one embodiment of the present invention, the configuration method can be a new configuration or a clone configuration of a pre-existing configuration. The MDS 100 representations of hardware resource includes design blocks that generally comprise analog and digital peripheral blocks of the target microcontroller device that can be customized for placement and configuration, e.g., programmed.

Figure 2:
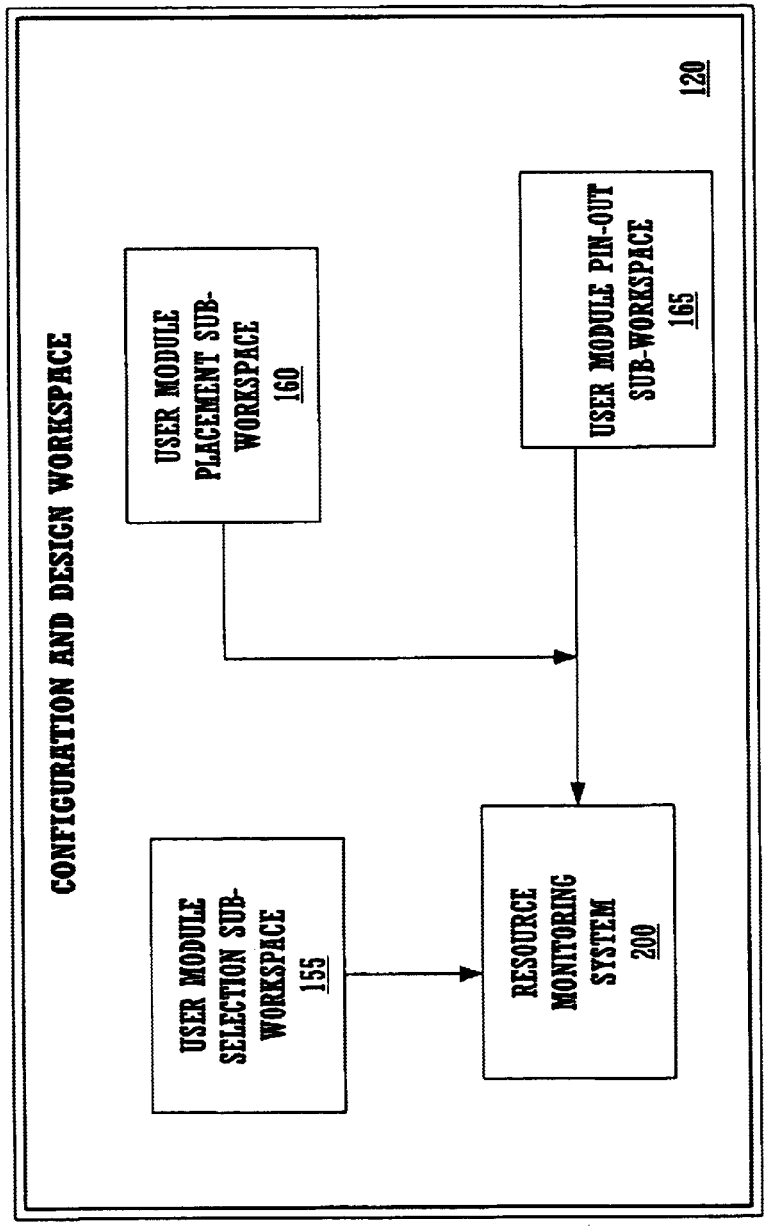
FIG. 2 is a block diagram of an embodiment of the configuration and design workspace of the present invention.

FIG. 2 illustrates the sub-workspaces of the configuration and design workspace 120 in accordance with an embodiment of the present invention. The user module selection sub-workspace 155 is used by the designer to select user modules from a catalog of available user modules. Each user module is a circuit design that can be implemented by one or more hardware resources of the programmable microcontroller.

To facilitate the selection of a user module, this sub-workspace 155 presents the types of user module in multiple series of easy to display catalogued icon group, with each user module having an icon and a descriptive label. Each group of icons can also have a descriptive label. When a user module is selected in one catalog or listing, an electronic datasheet is automatically displayed to give the designer some detailed information regarding the.,user module to aid in the selection thereof. Multiple user modules can be selected by the designer. As each one is selected, an associated histogram display illustrates the remaining programmable hardware resources of the micrcontroller.

The user module placement sub-workspace 160 is used by the designer to place a selected user module into one or more of the displayed hardware resources. Each hardware resource has an associated graphical display on the computer screen in the sub-workspace 160. Global resource parameters and user module parameter are also shown in graphical user interface windows. Multiple placement iterations can be performed.

The user module pin-out sub-workspace 165 is invoked by the designer in order to establish the proper pin selection and drive type for each pin of the programmable device. The pins can be connected to internal ports of the user module designs from the placement sub-workspace. Therefore, sub-workspaces 155, 160 and 165 of the configuration and design workspace 120 allow a chip designer to implement a custom circuit design onto a programmable hardware resource of the microcontroller using pre-configured user modules.

The user module resource monitoring system 200 is used by the designer to monitor hardware resource usage by user modules as they are selected by the designer. A designer can interactively specify selected characteristics of a user module that the design may want to track during the design of a target microcontroller by entries made into the resource monitoring system 200. Entries made into the resource monitoring system 200 are automatically displayed in the user module workspace 155. The monitoring system presents hardware resource usage by hardware resource type.

Figure 3:
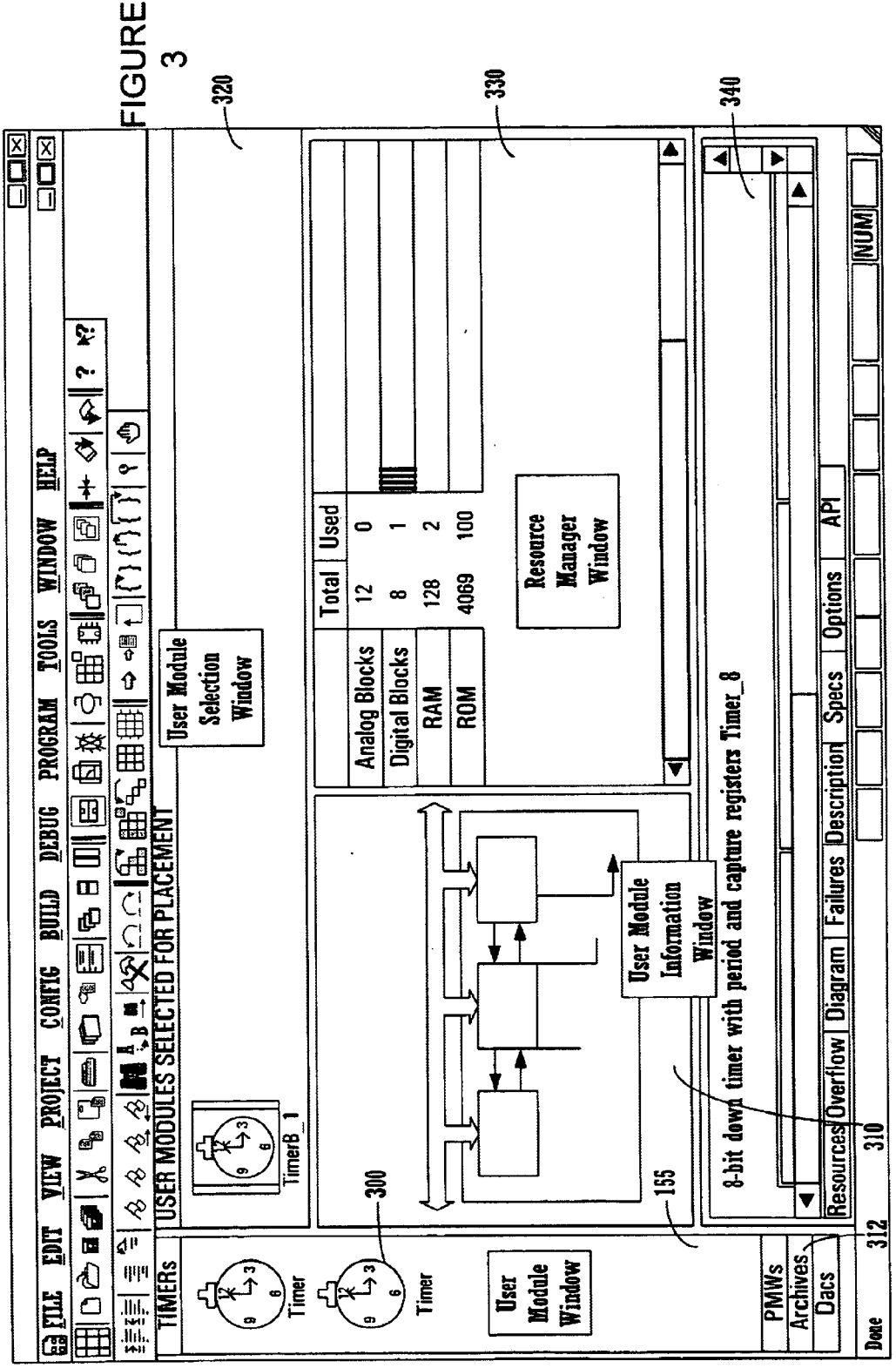
FIG. 3 is an exemplary screen display of the user module selection workspace of the configuration and design sub-system of an embodiment of the present invention.

FIG. 3 is an exemplary screen display illustration of one embodiment of the user module selection sub-workspace 155 of the configuration and design sub-system 120 of the present invention. As shown in FIG. 3, the user module selection sub-workspace 155 comprises user module catalog work-space 300, user module schematic datasheet 310, user module selection work-space 320, resource manager work-space 330 and user module datasheet work-space 340.

The user module work-space 300 provides multiple catalogs of user modules of components available for selection to be designed into the target microcontroller device. In order to access the user modules from the user module work-space 300, the programmer clicks on an icon representations of the desired component or textual representation of the same device to select the desired user module. Tabs 312 with descriptive labels can be used to select between the multiple catalogs of user modules. As shown in FIG. 3, the pulse width modulator or timer catalog is currently selected. Only two user module icons belong to this catalog.

Once the programmer clicks on the desired module, a detailed graphical representation 310 of the selected module is displayed and datasheet information is shown in the user module information work-space 340. From the user module information work-space 340, the programmer is able to view technical pertinent details about the selected module in a desired manner.

The resource manager window 330, described below illustrates hardware resource types and the usage of them based on selected user modules. In the example of FIG. 3, the type are analog blocks, digital blocks, RAM and ROM. According to the histogram bar, only digital blocks RAM and ROM are used by the one selected user module.

Figure 4:
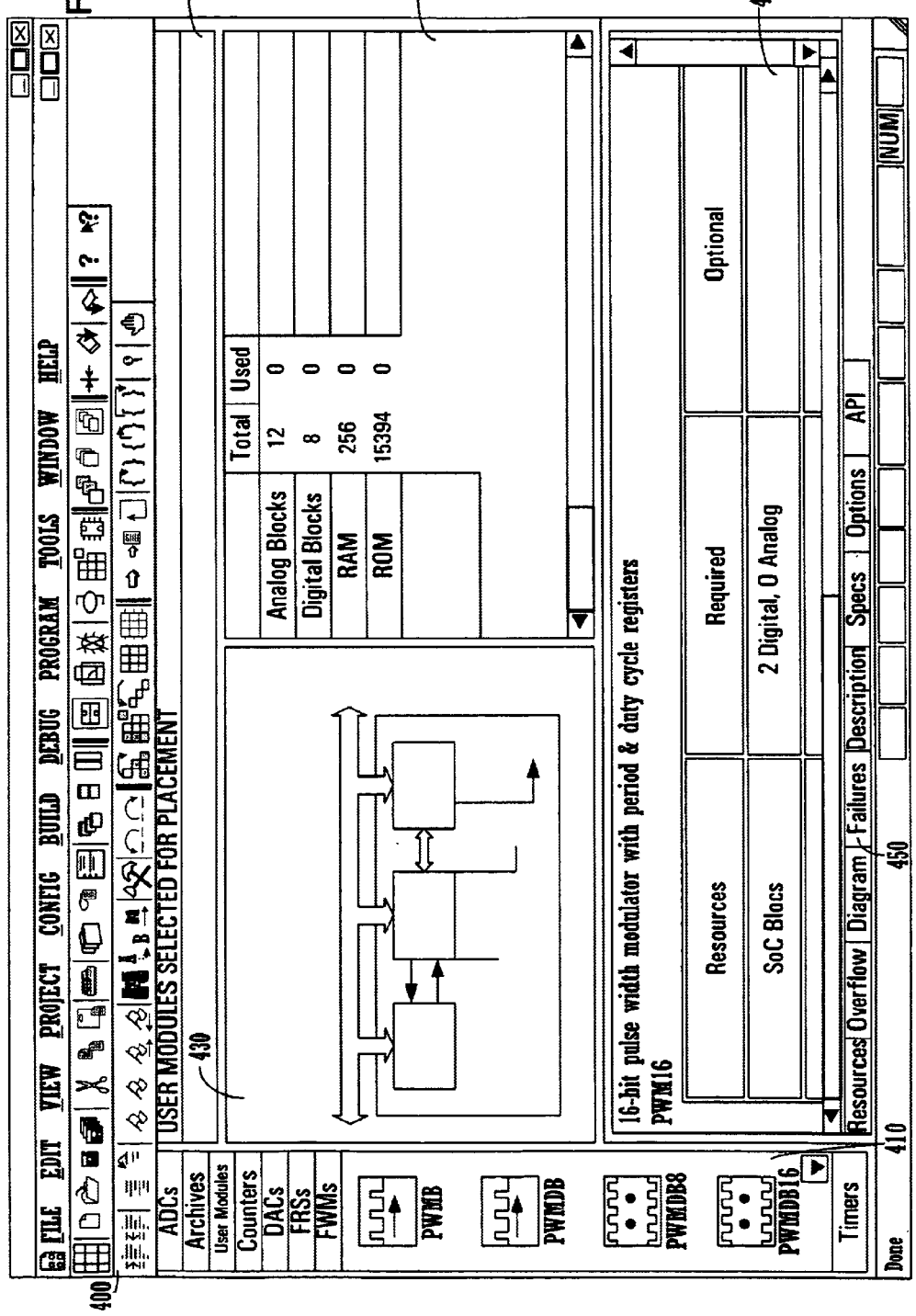
FIG. 4 is a exemplary screen display of the user module selection workspace of the present invention illustrating a displayed datasheet.

FIG. 4 is an exemplary screen shot 400 of one embodiment of the user module selection work-space 155 of the present invention with no user modules selected. The resource monitor window 330 illustrates that all hardware resources are therefore available. Selecting applicable user modules is the first step in the programming of a target microcontroller device by the programmer. The user modules are accessible pre-configured functions or designs that once the programmer has placed and programmed, work as a peripheral on the target microcontroller device.

As depicted in FIG. 4, the user module selection workspace 155 comprises a catalog of individual modules 410 with related titles to components that the programmer may use to define the target microcontroller device. To access the set of titles in the user selection module work-space 155 (e.g., Timers, Counters, PWMs, etc.) the programmer selects one of the titles and scrolls to see pre-configured options provided in database of the MDS 100.

In the other active windows of the configuration and design system 120, the programmer can view configuration data in display sub-workspace 420 related to an individual user module.

Still referring to FIG. 4, the programmer may click on different tab options in sub-workspace 420 to view additional information regarding a selected user module. Once the programmer has viewed and decided on the desired user modules, the programmer may select the desired modules by choosing the user module from sub-workspace 410. The programmer makes the selection by clicking on the desired module which then appears in the upper active work-space 430.

Figure 5:
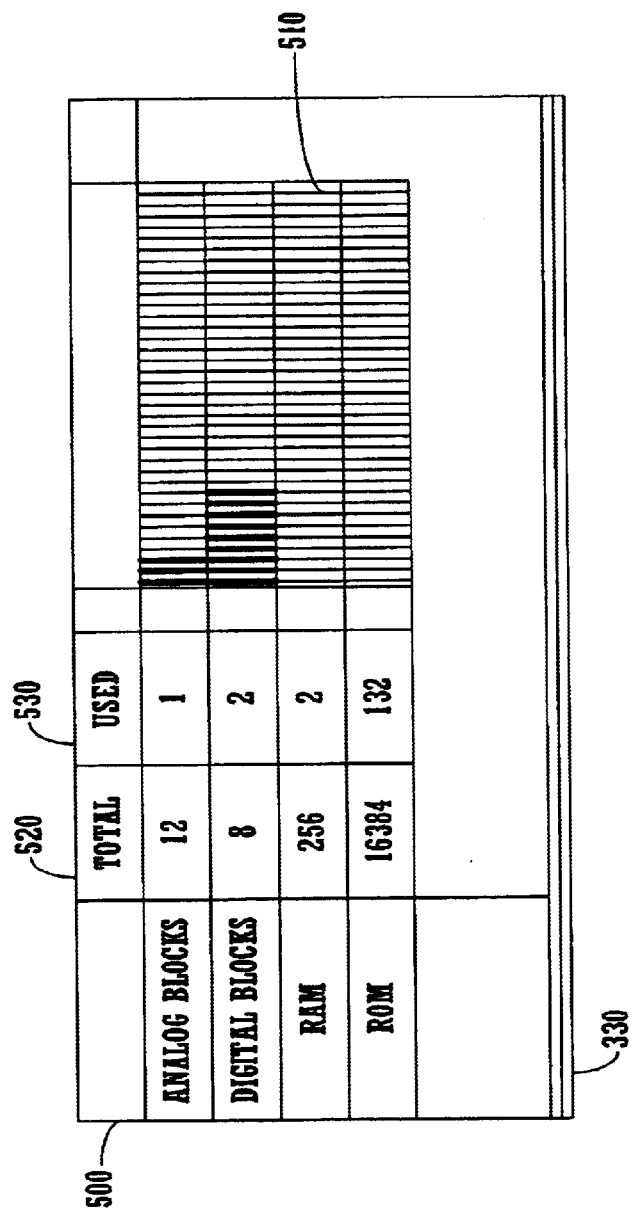
FIG. 5 is a diagram of an exemplary layout of the resource manager of the present invention.

FIG. 5 is a exemplary layout of one embodiment of the resource manager workspace 330 of the present invention. As shown in FIG. 5, the resource manager workspace 330 comprises module tabular grid 500, histogram bars 510, total resource available tabular grid 520 and resources used tabular grid 530. As the designer selects desired user modules, the user modules characteristics that the designer desires to track are displayed in grid 500. Grid 500, typically, is a line item entry of all the hardware resources that the designer desires to track in a particular design of a target microcontroller. As shown in FIG. 5, the line item entries in grid 500 may include the tracking of analog and digital blocks that may be used in the design of a particular microcontroller, the number of read and write memory (RAM) desired, etc.

The total number of available resources that the designer desires to track as a result of the line item entries in grid 500 are displayed in total available resource tabular grid 520. As illustrated in FIG. 5, there are 12 available analog block resources being tracked in the example in FIG. 5. As the designer selects additional user modules, the number of resources used is displayed in the used resources tabular grid 530. In one embodiment of the present invention, the contents of the used resource tabular grid 520 is dynamically and constantly updated as the designer adds and deletes user modules for a particular design. The total available resources are based on the chip selected for the design.

As shown histogram 510 is also presented that illustrates the usage of the different types of hardware resources of the microcontroller. As shown, the histogram 510 illustrates remaining digital, analog, ROM and RAM resources based on the selected user modules which appear in the selection box 320. As new user modules are placed into the selection box 320 ( FIG. 3), the histogram 510 automatically updates.

Figure 6:
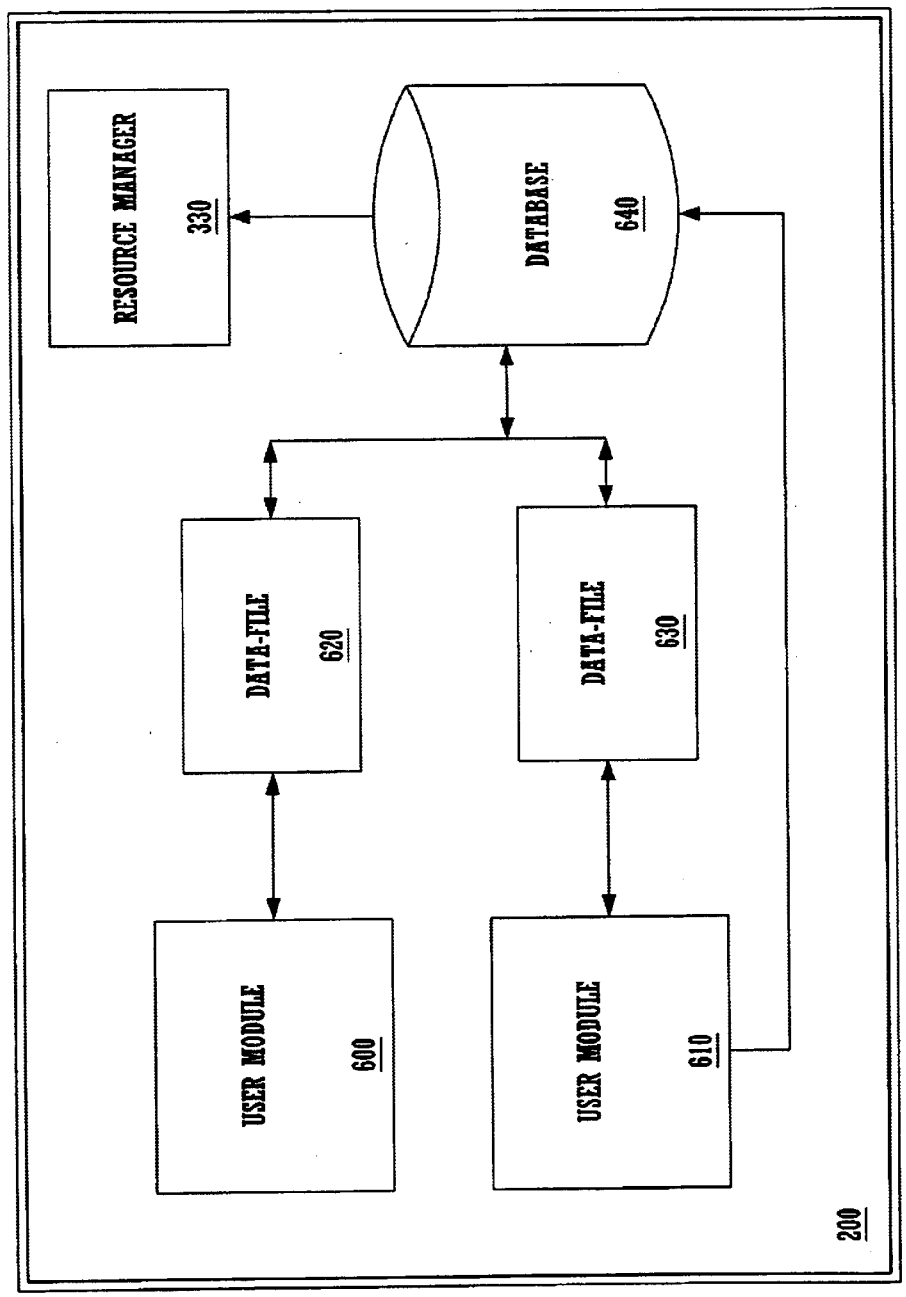
FIG. 6 is a block diagram of an embodiment of the resource monitoring system of the present invention.

FIG. 6 is a block diagram illustration of one embodiment of the resource monitoring system 200 of the present invention. As shown in FIG. 6, the resource monitoring system comprises user modules 600–610 from the user module workspace 410, resource manager workspace 330, data file 620–630 and database 640. The resource monitoring system 200 is a data driven system that provides the designer with an interactive monitoring workspace to interactively monitor hardware resource use by the target microcontroller as the designer selects user modules.

In one embodiment of the present invention, the MDS 100 automatically updates the data in the resource manager work-space 330 for each user module selected and added by the designer in the design process. The resource manager 330 is data driven by updates with the number of occupied hardware resources together with RAM and ROM usage by the current set of selected user modules. Data values of selected user modules are cumulatively presented for display in the resource manager workspace 330 by the resource monitoring system 200.

The data values are determined based on the specified characteristics of the user modules that the designer desires to monitor. In one embodiment of the present invention, the designer can monitor hardware resource usage for the power consumed by selected user modules in the user module workspace 410. The resource manager monitors the resources consumed by selected user modules, particularly memory, in the active work spaces the results are displayed in display 330. If the designer attempts to select a user module that requires more resources than is available in the MDS 100 database, the MDS 100 will not allow that particular user module to be selected.

In one embodiment of the present invention, the designer interactively make entries into data files 620–630 of the type of resource use the designer desires to monitor. Entries made to the data files 620–630 are stored in the database 640 and made available to the resource manager workspace 330 as user modules are either selected or deselected. Alternatively, the system may be configured with a default set of resources on which monitoring occurs. As user modules are selected, the histogram 510 in the resource manager workspace 330 is updated.

In one embodiment of the present invention, the data file 620–630 is an extensible markup language (XML) file that is associated with a specific user module and indicates, among other things, the hardware required by the user module.

In one embodiment of the present invention, the designer can monitor hardware resource usage of components selected to be incorporated into a target microcontroller. New entries in data file 620–630 are automatically displayed as line entries, e.g., line items 510 of FIG. 5. Having the data file 620–630 enables the designer to add data to drive the desired display of user module resource use without having to change the underlying MDS 100 program code.

Figure 7:
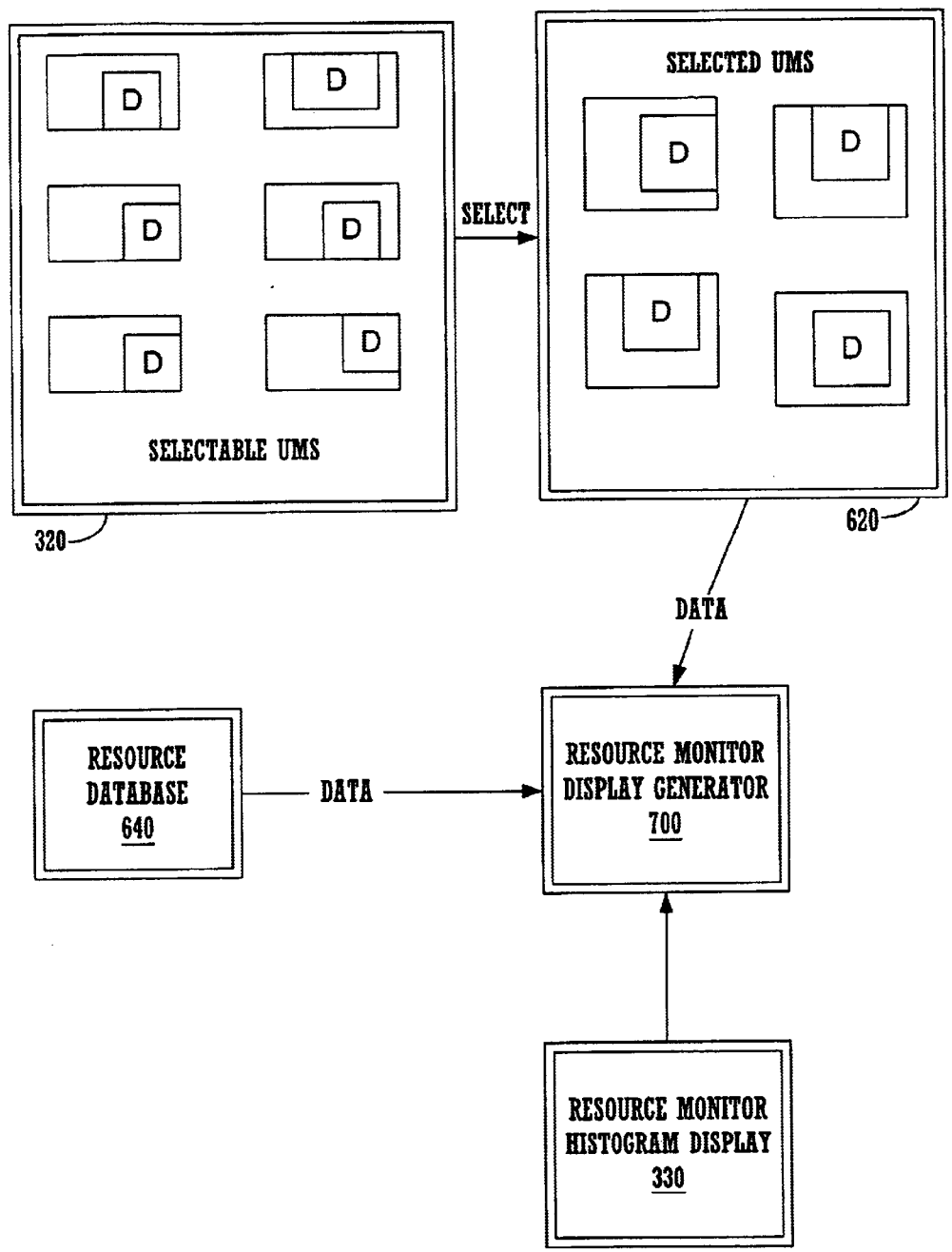
FIG. 7 is a block flow diagram of an embodiment of the data driven resource monitoring of the present invention.

FIG. 7 is a data flow diagram of one embodiment of the data driven monitoring of the present invention. As shown in FIG. 7, identified data values of specific user characteristics are selected by the designer selecting from the selectable user modules 320. The data values of the selected user modules are presented to the data file module 620. The data file module 620 contains predefined data from the selected user modules which the designer may pre-define and pre-configure prior to the design of the target microcontroller. Each user module contains a data portion "D" that describes the amount of hardware resources that it requires. In one embodiment, this data portion is formatted using XML.

Data values from the selected user modules are cumulatively presented by the data file module 620 to a resource monitor display generator 700. The resource monitor display generator 700 generates a cumulative value for each hardware resource that needs to be monitored by retrieving the data value information "D" from database 640 for each selected user module and the retrieved information is presented to the resource manager workspace 330 to be displayed. The resource monitor display generator 700 further accumulates the desired values of the hardware resource usage of the identified hardware resource that the designer desires to monitor during the design process. The complement of hardware resources for a target microcontroller are described in block 640. Updates to the user modules in the resource data base 640 only require a change in the contents of an associating data file module without a corresponding change in the underlying design system code. In one embodiment of the present invention, changes to the data file module 620 are immediately accessible and displayable when the corresponding user module is selected by the designer.

Therefore, the data driven resource monitor display can be updated by the user automatically selecting a user module, which will update the contents of the resource monitor display can be varied by changing the data portion "D" of a selected user module. Furthermore, the contents of the histogram can be changed by the user selecting a different microcontroller which as a different complement of hardware resources as represented in database 640. None of these changes in the resource monitor require any changes in the underlying code or any recompiling but rather only result in changing the input data to process 700.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the claims appended hereto and their equivalents.

What is claimed is:

1. A electronic device configuration system, comprising:
a device editor sub-system for editing the programming of components of said electronic device, said device editor sub-system comprising:
a user module selection workspace for providing selection of a plurality of pre-defined user modules that can be programmed into said electronic device;
a data driven resource monitoring system comprising
a resource manager workspace for tracking real-time resource usage of programmable hardware resources used by said selected user modules, wherein resource usage characteristics to be tracked are selected by a user.

2. The electronic device configuration system of claim 1, further comprising
a plurality of data file modules defined for each of said user modules for specifying resource usage characteristics of said user modules.

3. The electronic device configuration system of claim 2, wherein said data file modules are pre-defined with said selected characteristics of said user module.

4. The electronic device configuration system of claim 2, wherein said selected user module characteristics are interactively added to said data file module during the design of said electronic device.

5. The electronic device configuration system client of claim 1, wherein said resource manager workspace comprises a histogram workspace that displays said resource usage by resource type for said selected user modules.

6. The electronic device configuration system of claim 5, wherein said histogram workspace is interactively updated with resource usage of said selected user modules as said user modules are selected by said user module selection workspace.

7. The electronic device configuration system of claim 5, wherein said resource manager workspace further comprises a component tracking workspace for displaying said selected user module resource usage characteristics specified in said data file module.

8. The electronic device configuration system of claim 7, wherein said programmable hardware resources comprise analog and digital programmable resources.

9. The electronic device configuration system of claim 8, wherein said programmable hardware resources further comprise read and write memory resources.

10. The electronic device configuration system of claim 9, wherein said programmable hardware resources further comprise read only memory resources.

11. The electronic device configuration system of claim 10, wherein said hardware resources further comprise power consumption resources.

12. The electronic device configuration system of claim 2, wherein said data file modules are XML formatted data.

13. The electronic device configuration system of claim 1, further comprising a resource monitor display generator for automatically generating cumulative values for each of a specified hardware resource to be tracked in said resource manager workspace based on data representing said selected user modules.

14. A device editor system for programming a microcontroller device having programmable resources, comprising:
a user module selection workspace for providing a plurality of selectable pre-configured user modules to be programmed into said microcontroller device;
a data driven resource monitoring system for providing data representing selected resource characteristics of selected user modules;
a resource manager workspace for tracking real-time resource usage of said selected user modules based on said monitoring system, wherein resource usage characteristics to be tracked are selected by a user; and
a database for storing pre-defined resource usage information of said user modules.

15. The device editor system of claim 14, further comprising a plurality of data file modules defined for each of said user modules for specifying selected resource usage characteristics of said selected user modules.

16. The device editor system of claim 15, wherein said data file modules are pre-defined with said selected characteristics of said user modules.

17. The device editor system of claim 15, wherein said data file modules are represented in XML data.

18. The device editor system of claim 14, wherein said resource manager workspace comprises a graphical histogram display that displays said resource usage by said specified characteristics of said selected user modules.

19. The device editor system of claim 18, wherein said histogram display is interactively updated with resource usage of said selected user modules as said user modules are selected.

20. The device editor system of claim 18, wherein said resource manager display further comprises a component tracking display for displaying said selected user module resource usage characteristics specified in said data file module.

21. The device editor system of claim 19, wherein said programmable resources comprise analog and digital programmable resources.

22. The device editor system of claim 21, wherein said programmable resources further comprise read and write memory resources.

23. The device editor system of claim 22, wherein said programmable resources further comprise read only memory resources.

24. The device editor system of claim 23, wherein said programmable resources further comprises power consumption resources.

25. The device editor system of claim 14, further comprising a resource monitor display generator for generating cumulative values for each of a specified hardware resource to be tracked in said resource manager workspace.

26. A data driven method for designing a system on a chip comprising:
   a) selecting a user module from a series of catalogs of user module types found in a user module selection workspace, wherein said selecting causes display of datasheet information regarding said selected user module;
   b) placing said user module within a graphical representation of a hardware resource of a programmable circuit and using a user module placement workspace comprising a graphical layout of hardware resources of said programmable circuit; and
   c) interactively monitoring hardware resource usage information of said selected user module when said user module is selected from said series of catalogs of user module types, wherein resource usage characteristics to be monitored are selected by a user.

27. A method as described in claim 26, further comprising a providing data file for cumulatively providing said hardware resource usage information of said selected user module.

28. A method as described in claim 27, further comprising generating cumulative hardware resource usage values for display based on resource requirements of said selected user modules.

29. A method as described in claim 27, wherein said c) comprises updating of a histogram workspace displaying said hardware resource usage and wherein said user module selection workspace comprises said histogram workspace.

30. A method as described in claim 29, wherein said c) further comprises
   displaying and automatically updating a first textual tabular grid of total hardware resources available for said selected user modules.

31. A method as described in claim 30, wherein said c) further comprises
   displaying and automatically updating a second textual tabular grid of the number of hardware resources used out of said total hardware resources available for said selected user modules.

32. A method of programming an electronic circuit having programmable resources, said method comprising:
   a) selecting a user module from a plurality of user modules, wherein each user module defines an electronic circuit design to be implemented using a portion of said programmable resources and wherein each user module has defined a respective data file describing its resource requirements;
   b) based on a user module selection, automatically updating a resource monitor display illustrating resource usage of said electronic circuit by selected user modules, wherein resource usage characteristics to be monitored are selected by a user; and
   c) rendering said resource monitor display.

33. A method as described in claim 32 wherein said resource monitor display comprises a histogram comprising distinct graphical images for each resource type of said programmable resources.

34. A method as described in claim 33 wherein said data files are formatted in extensible markup language (XML) data.

35. A method as described in claim 32 wherein said b) and said c) are performed by an automatic resource monitor display generator accepting a first data input describing resource requirements for selected user modules and a second data input describing said programmable resources.

36. A method as described in claim 32 wherein said electronic device is a microcontroller and wherein said programmable resources are programmable analog and digital resources.

37. A method as described in claim 36 wherein said programmable resources further comprise memory.

* * * * *